(12) United States Patent
Joo et al.

(10) Patent No.: US 8,952,248 B2
(45) Date of Patent: Feb. 10, 2015

(54) DYE-SENSITIZED SOLAR CELL MODULE AND METHOD OF FABRICATING THE SAME

(75) Inventors: Sung Hoon Joo, Paju-si (KR); Seong Kee Park, Goyang-si (KR); Seung Hoon Ryu, Seoul (KR); Noh Jin Myung, Goyang-si (KR); So Mi Jeong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 222 days.

(21) Appl. No.: 12/962,199

(22) Filed: Dec. 7, 2010

(65) Prior Publication Data
US 2011/0146783 A1   Jun. 23, 2011

(30) Foreign Application Priority Data
Dec. 18, 2009 (KR) .................. 10-2009-0127437

(51) Int. Cl.
*H01G 9/20* (2006.01)
(52) U.S. Cl.
CPC ........... *H01G 9/2031* (2013.01); *H01G 9/2068* (2013.01); *Y02E 10/542* (2013.01)
USPC ......................................... 136/263; 136/252
(58) Field of Classification Search
USPC ................................................ 136/263, 252
See application file for complete search history.

(56) References Cited

U.S. PATENT DOCUMENTS

| 6,362,121 | B1 * | 3/2002 | Chopin et al. ................ 502/2 |
| 6,376,765 | B1 * | 4/2002 | Wariishi et al. ............ 136/263 |
| 2003/0196692 | A1 | 10/2003 | Koyanagi et al. |
| 2005/0109391 | A1 | 5/2005 | Kobayashi |
| 2005/0274408 | A1 * | 12/2005 | Li et al. .................... 136/244 |
| 2010/0024875 | A1 * | 2/2010 | Fukui et al. ............... 136/256 |

FOREIGN PATENT DOCUMENTS

| CN | 101567274 | 10/2009 | |
| EP | 2 043 191 A1 | 4/2009 | |
| JP | 2002-110261 | 4/2002 | |
| JP | 2003-308891 | 10/2003 | |
| JP | 2005-108836 | 4/2005 | |
| JP | 2009-087573 | 4/2009 | |
| WO | WO 96/29716 A1 | 9/1996 | |
| WO | WO 2008/004556 A1 * | 1/2008 | ............ H01M 14/00 |
| WO | WO 2009/013285 A1 * | 1/2009 | ............ H01G 9/20 |

* cited by examiner

*Primary Examiner* — Golam Mowla
(74) *Attorney, Agent, or Firm* — McKenna Long & Aldridge LLP

(57) ABSTRACT

A dye-sensitized solar cell module is disclosed. The dye-sensitized solar cell module includes a solution capable of being selectively printed on only a desired region and used in the formation of a metal oxide film. The solution for the metal oxide film formation can be selectively printed on only the surface of metal oxide nano-particle without affecting the electrical conductivity of the electrode and a sealant interposed between transparent electrodes. Therefore, the dye-sensitized solar cell module can greatly improve the output efficiency. Moreover, the dye-sensitized solar cell module can prevent the output efficiency deterioration at an enlarged size.

8 Claims, 2 Drawing Sheets

DYE-SENSITIZED SOLAR CELL MODULE AND METHOD OF FABRICATING THE SAME

CROSS-REFERENCE TO RELATED APPLICATION

This application claims priority under 35 U.S.C. 119 to Korean Patent Application No. 10-2009-0127437, filed on Dec. 18, 2009, which is hereby incorporated by reference in its entirety.

BACKGROUND

1. Field of the Disclosure

This disclosure relates to a dye-sensitized solar cell and a fabricating method thereof, and more particularly to a dye-sensitized solar cell with a solution capable of being selectively printed on the surface of a metal oxide nano-particle and to a method of fabricating the same.

2. Description of the Related Art

To meet recent increasing energy demands, a variety of solar cells have been developed which convert solar light energy into electrical energy. The solar cells include CIGS (copper indium gallium (di)selenide) solar cells, silicone-based solar cells, dye-sensitized solar cells, semiconductor solar cells, and so on.

In general, the solar cell generates electron-hole pairs within its semiconductor by external light. Among the electron-hole pairs, the electrons move to an n-type semiconductor and the holes move to a p-type semiconductor, by an electric field generated between the p-type and n-type semiconductors. Accordingly, electrical power is produced.

The solar cells use sunlight which regards as an infinite source. As such, the solar cells are pro-environmental unlike the other energy sources. Also, silicon solar cells are recently in the spotlight of entire world due to an energy problem after being primarily developed in 1983.

The silicon solar cells cause a sharp competition between nations due to a silicon supply problem, thereby increasing their manufacturing costs. Also, many countermeasures are being proposed by domestic and foreign research institutes, but it is difficult to deal with the above problems. As a countermeasure for dealing with the sharp energy problem, a dye-sensitized solar cell has been proposed by a MG (Micheal Grazel) institute within EPEL (Ecole Polytechnique Federale de Lausanne) in Switzerland.

The dye-sensitized solar cell, as a solar cell with optical, electrical and chemical properties, is configured to include sensitive dye molecules and a transition metal as main materials unlike the silicon solar cell. The sensitive dye molecules can generates electro-hole pairs by absorbing visible rays. The transition metal is used for transmitting the generated electrons.

Such a dye-sensitized solar cell has a lower manufacturing cost in comparison with the modern silicon solar cells. Also, the dye-sensitized solar cell can be applied to the outer glass windows of buildings, greenhouse and so on, because of their transparent electrode.

In accordance with an electro transmission system of the dye-sensitized solar cell, the electron-holes pairs are generated in the dye molecules which are excited by light. A part of the electrons included in the electron-hole pairs is drifted to a transparent electrode (hereafter, "transparent cathode electrode") through drifting paths, which are formed by an interface between metal oxide nano-particles, before being supplied to an external resistor (i.e., an external circuit as a load) via the transparent cathode electrode. On the other hand, the residual electrons are drifted toward the other transparent electrode (hereinafter, "transparent anode electrode") and returned to the dye molecules by a redox reaction of an electrolyte between the metal oxide nano-particles and the transparent anode electrode. As a factor affecting a conversion efficiency of the solar cell in the electron transmission system, it is that the electron and hole must be easily separated from each other in the excited state of the dye molecule as well as the separated electron must be drifted to the transparent cathode electrode through the path between the metal oxide particles without any resistance. Particularly, if it is a defect in an electron drift path, the loss of electrons is caused. However, since the general metal oxide nano-particle has a diameter range of about 10~20 nm and a layer formed by the metal oxide nano-particles has a thickness range of 10~15 μm, it is difficult to prepare the electron drift path without any defect.

To address the above matter, a single element solar cell (hereinafter, "single solar cell") has been proposed which includes a metal oxide film formed in a thickness range of several to several tens nanometer on the surfaces of nano-particles. The metal oxide film on the surface of the nano-particle is formed using a titanium dioxide solution of weak viscosity which is ordinarily used as a post-processing solution. The titanium dioxide solution cannot be selectively printed due to its week viscosity. As such, the titanium dioxide solution can be applied to the single solar cell, but cannot be applied to a solar cell module which is configured with metal electrode layers divided into the number of solar cells. This results the fact that the metal oxide film is formed on the electrode so as to increase an internal resistance and lower the output efficiency when the titanium dioxide solution is applied to the solar cell module.

Therefore, it is necessary for a solution capable of being selectively printed on only a desired region and used in the formation of a metal oxide film, in order to greatly improve the conversion efficiency of a dye-sensitized solar cell module and prevent the conversion efficiency deterioration, which corresponds to a sharp disadvantage, in large-sized dye-sensitized solar cell modules.

BRIEF SUMMARY

Accordingly, the present embodiments are directed to a dye-sensitized solar cell module that substantially obviates one or more of problems due to the limitations and disadvantages of the related art and a method of fabricating the same.

An object of the present embodiments is to provide a dye-sensitized solar cell module which includes a solution capable of being selectively printed on only a desired region and used in the formation of a metal oxide film, and a method of fabricating the same.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a dye-sensitized solar cell module includes: a first substrate; a first electrode disposed on the first substrate; a blocking film disposed on the first electrode; nano-particles arranged on the blocking film; a film formed to encompass each of the nano-particles; a second substrate with a second electrode disposed above the nano-particles; an electrolyte interposed between the first and second electrodes; and a metal electrical conductivity line formed to connect the first electrode with the second electrode.

A fabricating method of the dye-sensitized solar cell module according to another aspect of the present embodiment includes: forming a first electrode on a first substrate; forming a metal electrical conductivity line on the first electrode; forming a blocking film on the first electrode; forming nano-particles on the blocking film; forming a film configured to encompass each of the nano-particles; forming a second substrate which includes a second electrode disposed above the nano-particles; and injecting an electrolyte between the first and second electrodes. The film is formed by forcing a titanium dioxide organosol solution to remain.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
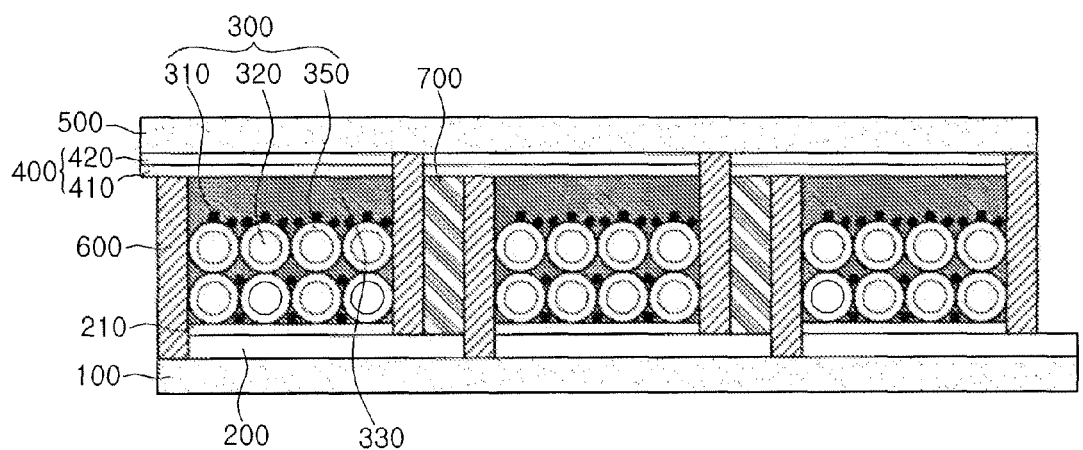
FIG. 1 is a cross-sectional view showing a dye-sensitized solar cell module according to an embodiment of the present disclosure.

In the present disclosure, it will be understood that when an element, such as a substrate, a layer, a region, a film, or an electrode, is referred to as being formed "on" or "under" another element in the embodiments, it may be directly on or under the other element, or intervening elements (indirectly) may be present. The term "on" or "under" of an element will be determined based on the drawings. In the drawings, the sides of elements can be exaggerated for clarity, but they do not mean the practical sizes of elements.

Reference will now be made in detail to the embodiments of the present disclosure, examples of which are illustrated in the accompanying drawings.

Figure 2:
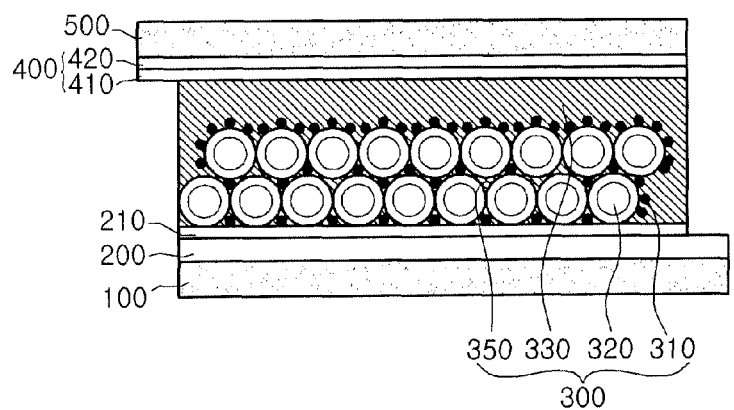
FIG. 2 is a cross-sectional view showing a unit cell included in the dye-sensitized solar cell module according to an embodiment of the present disclosure.
Figure 3:
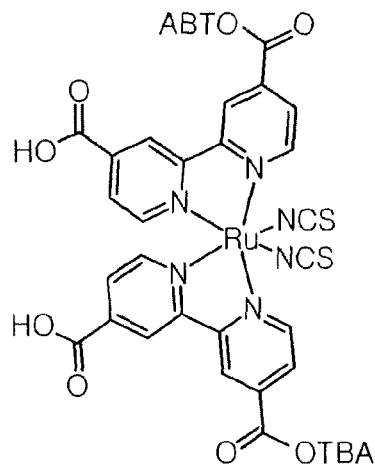
FIG. 3 is a chemical formula representing a dye material used in the dye-sensitized solar cell module according to an embodiment of the present disclosure.

FIG. 1 is a cross-sectional view showing a dye-sensitized solar cell module according to an embodiment of the present disclosure. FIG. 2 is a cross-sectional view showing a unit cell included in the dye-sensitized solar cell module according to an embodiment of the present disclosure.

Referring to FIGS. 1 and 2, a solar cell module according to an embodiment of the present disclosure includes a first substrate 100, a first electrode 200, a blocking film 210, a light absorption layer 300, a second electrode 400, a second substrate 500, a sealant 600, and a metal electrical conductivity line 700. The light absorption layer 300 includes a dye 310, nano-particles 320, a film 350 and an electrolyte 330. The second electrode 400 includes a catalytic electrode 410 and a transparent electrode 420.

The first substrate 100 is a transparent insulator. As a first substrate 100, a glass substrate, a quartz substrate, or a plastic substrate can be employed. The plastic substrate can be formed from one material selected from a material group which includes polyethylene terephthalate (PET), polyethylene naphthalate (PEN), polycarbonate (PC), polypropylene (PP), polyimide (PI), triacetyl cellulose (TAC), and their copolymers, but is not limited to this. The first substrate 100 can be doped with one material selected from a material group which includes titanium, indium, gallium, and aluminum.

The first electrode 200 is disposed on the first substrate 100. The first electrode 200 can be formed to include an electrically conductive metal oxide film. The electrically conductive metal oxide film can become one material selected from a material group which includes indium-tin-oxide (ITO), fluorine-tin-oxide (FTO), $ZnOGa_2O_3$, $ZnOAl_2O_3$, tin-based composite oxides, antimony-tin-oxide (ATO), Zinc oxide, and their mixtures, and more preferably fluorine-doped tin dioxide ($F:SnO_2$).

The blocking film 210 is disposed on the first electrode 200. The blocking film 210 is formed from a metal oxide. Alternatively, the blocking film 210 can be formed from titanium dioxide. Such a blocking film 210 can improve a contact force with the nano-particles 320 which will be formed later.

The light absorption layer 300 is disposed on the first electrode 200. The light absorption layer 300 is configured to include the dye 310, the nano-particles 320, the film 350 and the electrolyte 330.

The nano-particle 320 can be formed from one material selected from a material group which includes a semiconductor, making silicone its representative, a compound semiconductor, a compound with a perovskite structure, and others.

As an example of the semiconductor, an n-type semiconductor enabling electrons within the conduction band to be carriers in an excited-state by light can be employed. The compound semiconductor can become a metal oxide containing one material which is selected from a group including titanium, tin, zinc, tungsten, zirconium, gallium, indium, yttrium, niobium, tantalum, and vanadium. It is preferable for the metal oxide to use one material among titanium oxide, tin oxide, zinc oxide, niobium oxide, titanium strontium oxide, and their mixtures. More preferably, it is used an anatase type titanium oxide as a metal oxide. These semiconductors are not limited to the above specified materials. In other words, each of the above materials and the mixtures with at least two of the above materials can be used as a respective semiconductor.

It is assumed that the nano-particle 320 included in the present embodiment is a metal oxide nano-particle. In this case, a titanium oxide nano-particle may be used as a metal oxide nano-particle.

An average diameter of the nano-particles 320 may be about 1 nm~500 nm. It is preferable for the average diameter of the nano-particles to be in a diameter range of about 1 nm~100 nm. More preferably, the average diameter of the nano-particles becomes a diameter range of 10 nm~20 nm.

Such nano-particles can include only large and small diameter particles mixed. Also, the nano-particles are used in a multi-layer structure.

In case the metal oxide nano-particles are used as nano-particles, as described above, the metal oxide nano-particles can be arranged on the blocking film 210 in the shape of a metal oxide particle thin-film. The metal oxide particle thin-film can be formed on the blocking film 210 by spraying the metal oxide nano-particles. Alternatively, the metal oxide particle thin-film on the blocking film 210 can be extracted through an electrical extraction process which uses the first substrate (i.e., the first electrode 200) as an electrode. In a different way, the metal oxide nano-particle thin-film can be formed on the blocking film 210 by coating a paste containing the metal oxide particles on the blocking film 210 before performing one of drying, hardening and plasticating processes for the coated paste. The paste containing the metal oxide nano-particles can be obtained by hydrolyzing a metal oxide nano-particle slurry or metal oxide nano-particle precursor.

Each of the film 350 is formed on a surface of the respective nano-particle 320. As such, the film 350 can encompass the respective nano-particles 320. In view of this point, the film 350 can be configured with a plurality of capsulized films 350. Also, the film 350 can be formed from a metal oxide. The metal oxide can be titanium dioxide. Such a film 350 can prevent the loss of electrons which is generated in interfaces between the metal oxide nano-particles 320. This film 350 will be explained in detail below.

The dye 310 absorbs external light and generates excited electrons. Such a dye 310 can adhere to the surface of the film 350, the surfaces of the capsulized films 350.

It is possible for the electrolyte 330 to use a redox electrolyte. More specifically, one material selected from a material group, which includes a halogen redox-based electrolyte containing a halogen compound and halogen molecules, a metal redox-based electrolyte, an organic redox-based electrolyte, and others, can be used as an electrolyte 330. The metal redox-based electrolyte includes a metal complex and others. The metal complex includes a ferrocyanate-ferrocyanide ion complex, a ferrocene-ferricynium ion complex, a cobalt complex, and others. The organic redox-based electrolyte includes alkylthiol-alkyldisulfide, viologen dyes, hydroquinone-quinone, and others. It is preferable for the electrolyte 330 to employ one material of the halogen redox-based electrolytes.

As an example of the halogen molecule contained in the halogen redox-based electrolyte, it is preferable to employ iodine molecules. Also, the halogen compound can become a halogenated metal suit, an organic ammonium sult of halogen, or diiodine. The halogenated metal sult includes LiI, NaI, $CaI_2$, $MgI_2$, CuI, and others. The organic ammonium suit of halogen includes tetra-alkyl ammonium iodine, imidazolium iodine, pyridinium iodine, and others The redox electrolyte can be used or provided in the shape of a solution. In this case, the solution can include an electrochemically inactive solvent. In detail, one selected from a group, which includes acetonitrile, propylene carbonate, ethylene carbonate, 3-methoxypropio(no)nitrile, methoxy acetonitrile, ethylene glycol, propylene glycol, diethylen glycol, triethylene glycol, butyrolactone, dimethoxyethane, dimethy carbonate, 1,3-dioxolane, methyl formate, 2-methyl tetrahydrofuran, 3-methoxy-oxazolidin-2-ones, sulfolane, tetrahydrofuran, water, and others, can be employed as the electrochemical inactive solvent. More preferably, the electrochemically inactive solvent becomes one among acetonitrile, propylene carbonate, ethylene carbonate, 3-methoxypropio(no)nitrile, ethylene glycol, 3-methoxy-oxazolidin-2-ones, butyrolactone, and so on. The above solvents can be used alone or in the shape of a mixture with at least two The second electrode 400 is disposed on the light absorption layer 300. The second electrode 400 can be configured to include the catalytic electrode 410 and the transparent electrode 420.

The catalytic electrode 410 is used to activate a redox couple. This catalytic electrode 410 can be formed from an electrically conductive material. The electrically conductive material can include platinum, gold, ruthenium, palladium, rhodium, iridium, osmium, carbon, titan oxide, an electrically conductive macromolecular material, and others.

The transparent electrode 420 can be formed from a transparent material. More specifically, the transparent electrode 420 can be formed from one material selected from a material group which includes indium-tin-oxide, fluorine-tin-oxide, antimony-tin-oxide, zinc oxide, tin oxide, $ZnO$—$Ga_2O_3$, $ZnO$—$Al_2O_3$, and others.

In order to improve catalytic effect of a redox reaction between the catalytic electrode 410 and the first electrode 210, the catalytic electrode 410 facing the first electrode 210 is preferably formed in a fine structure which provides a large surface area. Also, it is preferable that the catalytic electrode 410 formed from platinum or gold must become black and the catalytic electrode 410 formed from carbon must have a porous state. The black state of platinum can be formed by performing an anodizing process, a chloroplatinic acid process, or other for platinum. Carbon of the porous state can be obtained by sintering carbon corpuscles or plasticating an organic polymer.

Similarly to the first substrate 100, the second substrate 500 is also a transparent insulator. As a second substrate 500, a glass substrate, a quartz substrate, or a plastic substrate can be employed. The plastic substrate can is formed from one material selected from a material group which includes polyethylene terephthalate (PET), polyethylene naphthalate (PEN), polycarbonate (PC), polypropylene (PP), polyimide (PI), triacetyl cellulose (TAC), and others.

The sealant 600 is interposed between the first and second substrates 100 and 500. The sealant 600 is formed to define unit cells. Also, the sealant 600 can have conductivity. The unit cell defined by the sealant is filled with the electrolyte 330 which is injected through an injection hole (not shown). Moreover, the sealant 600 is disposed on a side surface of the metal electrical conductivity line 700. Such a sealant 600 can prevent the metal electrical conductivity line 700 from damaging by the electrolyte 330.

The metal electrical conductivity line 700 connects the first electrode 200 with the second electrode 400. In other words, the dye-sensitized solar cell module according to the present embodiment uses the metal electrical conductivity line 700 to connect the unit cells with one another. The metal electrical conductivity line 700 can be formed from a metal with electrical conductivity. For example, the metal electrical conductivity line 700 can be a silver conduction line.

The metal oxide film 350 according to the present embodiment can encompass the nano-particles 320, respectively. Also, the metal oxide film 350 can be a titanium dioxide film. Such a metal oxide film 350 can prevent the loss of electrons which is generated in interfaces between the metal oxide nano-particles 320. In other words, the metal oxide film 350 forces exited electron, which are generated by light being absorbed into the dye, to be transmitted to the first electrode 200.

Alternatively, the metal oxide film 350 is formed from a titanium dioxide organosol solution. In this case, the metal oxide film 350 can be formed on only a part of the surface of the nano-particle 320, because the titanium dioxide organosol solution has a viscosity. This results from the fact that the titanium dioxide organosol solution includes titanium dioxide existing in a sol state within an organic solution which is a dispersive medium. The titanium dioxide organosol solution can have a viscosity range of 3~5 cP (centipoise).

The above metal oxide film 350 formed from the titanium dioxide organosol solution does not flow down toward the blocking film 210 because of its superior adhesion force to the titanium dioxide nano-particle. As such, the metal oxide film 350 is formed on only the surface of the metal oxide nano-particle 320. In accordance therewith, the metal oxide film 350 is formed in an interface between the metal oxide nano-particles 320. Also, the titanium dioxide organosol solution not only cannot soak through the sealant 600 but also cannot contact the metal conductive line 700, even though it flows down to the blocking film 210. This is why the titanium dioxide organosol solution has a viscosity. As such, the loss of electrons due to the metal oxide film 350 is hardly generated in the interface between the metal oxide nano-particles 350 due to the metal oxide film 350. Therefore, the excited electrons can be effectively transmitted to the first electrode 200. Moreover, as a draft path of the excited electron reaching the first electrode 200 is shortened by the metal oxide film 350, the excited electrons can be more effectively transmitted.

The dye-sensitized solar cell module according to the present embodiment brings the first electrode 200 into direct contact with the metal electrical conductivity line 700. In other words, the first electrode 200 and the metal electrical conductivity line 700 directly contact each other without interposing the metal oxide film 350 between the first electrode 200 and the metal electrical conductivity line 700. As such, the first electrode 200 and the metal electrical conductivity line 700 do not affect an internal resistance of the dye-sensitized solar cell module. Therefore, the dye-sensitized solar cell module of the present embodiment can prevent the conversion efficiency decrement which is caused by its internal resistance. Also, the dye-sensitized solar cell module can prevent the conversion efficiency decrement which is caused by being enlarged in size. Furthermore, the titanium dioxide organosol solution can be selectively printed on only the surface of the metal oxide nano-particle, which corresponds to a desired region, without affecting the sealant 600 interposed between the transparent electrodes.

Now, a dye-sensitized solar cell module fabrication method of the present embodiment using titanium dioxide as a metal oxide will be exemplarily explained, but it is not limited to this.

1. Embodiment: Fabrication of Dye-sensitized Solar Cell Module (1) Process of Compounding a Titanium Dioxide Organosol Solution Diethanolamine and 136 ml of titanium tetrabutoxide are dissolved in ethanol and vehemently stirred together with the ethanol during about one hour. Subsequently, a mixture solution of 7 ml of water and 200 ml of ethanol is slowly dropped into the dissolved and stirred solution and re-stirred together with the dissolved and stirred solution during about one day, thereby preparing a titanium dioxide organosol. The titanium dioxide organosol solution obtained through the above processes is concentrated in a quantity of about 100 ml using a rotary evaporator. The concentrated titanium dioxide organosol solution is stored within an airtight container upon a low temperature of about 5° C.

(2) Process of Forming Electrode Substrates

A single FTO glass is cut into two substrates having a size of 10 cm×10 cm, thereby preparing FTO glass substrates to be used as working and counter electrodes. The single FTO glass is an electrical conductive glass and is being covered with an FTO (fluorine-doped tin oxide) film. The FTO glass substrates are supersonically washed using a glass cleaner during about 10 minutes before soapy water is completely removed from the FTO glass substrates using distilled water. Subsequently, the FTO glass substrates are supersonically washed two times using ethanol during about 15 minutes. Thereafter, the FTO glass substrates are completely rinsed with ethanol absolute and then dried within oven of 100° C. The FTO film on each the FTO glass substrates, as prepared above, is etched in a line width of 60 μm, corresponding to a boundary between cells, along a pattern of the solar cell module using a fiber laser etching machine which outputs a laser beam having a wavelength of 1064 nm. At this time, the laser beam of the fiber laser etching machine is output in a power of 12.5 W and shifted at a speed of 800 mm/sec. Afterward, a silver (Ag) paste is printed on each of the FTO glass substrates, which will be used as anode and cathode substrates, through a screen printing process. The silver paste is used to form a silver electrical conductivity line which is configured to have a thickness of about 14 μm and a width of 0.5 mm and used as an interconnector connecting anode and cathode electrodes (i.e., the first and second electrodes 200 and 400) of adjacent cells within the solar cell module. The printed silver paste on each the FTO glass substrates is annealed at a temperature of 450° C. during 30 minutes, thereby forming the silver (Ag) electrical conductivity line.

(3) Process of Forming Working Electrode

A titanium dioxide blocking film improving a contact force between the transparent electrode and the titanium dioxide nano-particle is formed on the surface of one (hereinafter, "cathode substrate") of the etched and silver-electrical-conductivity-line-formed FTO glass substrates (i.e., on the residual FTO film which is used for the first electrode 200 (or the transparent cathode electrode). To this end, the cathode substrate with the transparent cathode electrode is washed with distilled water after being dipped into 40 ml of a titanium chloride (IV) solution heated at a temperature of 70° C. during about 40 minutes, and then is dried within an oven of the temperature of 100° C. so as to completely remove moisture. Subsequently, a titanium dioxide paste (18-NRT) of CCIC (Chine Commodities Inspection Corporation) is printed on the transparent cathode electrode by a screen printer using a mask which includes cell patterns arranged within a printing area of 10 cm×10 cm size. The paste-printed cathode substrate is dried 4 times in an interval of 20 minutes within an oven of the temperature of 100° C., before being plasticated at a temperature of 480° C. during 30 minutes, thereby preparing a cathode substrate covered with titanium dioxide nano-particles which are arranged in a thickness of about 10 μm. The titanium dioxide nano-particle layer with the thickness of about 10 μm will be used as a working electrode.

(4) Process of Forming Titanium Dioxide Film on Working Electrode

The organosol solution, as prepared above, is printed on the cathode substrate, which is provided with the titanium dioxide blocking film and the silver (Ag) electrical conductivity line, by a screen printer using a 400 mesh stainless still screen which has the same patterns as that used in the printing process of the titanium dioxide paste. Then, the printed organosol solution on the cathode substrate is sintered within an oven at a temperature of 450° C. during about 90 minutes, so that a titanium dioxide film is evenly formed on the nano-particle layer.

After the above annealing process, the cathode substrate with the titanium dioxide film is dipped into a solution of ruthenium-based organic metal dye (N-719)/absolute ethanol with a density of 40 nM during about 24 hours, so that the dye is absorbed into and adhered to the titanium oxide film. Subsequently, residual dye being not absorbed is completely washed using ethanol before drying the dye-absorbed cathode substrate at a temperature of 60° C. during 10 minutes.

(5) Process of Forming Counter Electrode

Two penetration holes are formed in the other (hereinafter, "anode substrate") of the FTO glass substrates (or transparent electrode substrates) of 10 cm×10 cm size, for which the laser-etching process and the silver (Ag) electrical conductivity line printing process are performed, using a diamond drill (for example, Dremel multipro 395) with a diameter of 0.5 mm. The penetration holes are used to inject the electrolyte into every cell. Then, the anode substrate is washed using distilled water and dried at a temperature of 100° C. during 30 minutes. Thereafter, a transparent mixture solution with a high viscosity is printed on the anode substrate with the penetration holes using a stainless still screen (325 mesh) which has the same pattern as that used in the formation of the titanium dioxide film. The transparent mixture solution is previously prepared by mixing hydrogen hexachloroplatinate ($H_2PtCl_6$) and 2-propanol in a volume ratio of 1:2 and stirring them during 30 minutes. Next, the anode substrate with the printed transparent mixture solution is sintered within an oven at a temperature of 400° C. during 30 minutes after an organic solvent is removed from the printed mixture solution by drying the anode substrate within an oven of the temperature of 100° C., thereby allowing a counter electrode, which is used as a catalytic electrode 410, to be formed on the cathode substrate.

(6) Process of Bonding Working Electrode and Counter Electrode

The cathode and anode substrates (i.e., two transparent electrode substrates) are combined by arranging Surlyn stripes of the thickness of 1 mm~2 mm on the silver(Ag) electrical conductivity line and the edges of the cathode substrate and bonding the two substrates using a heating presser. This combining process is performed for the two substrates in such a manner that the working and counter electrodes face each other. An electrolyte solution is injected between the combined substrates through the two penetration holes, which are formed in the counter substrate (i.e., the transparent anode electrode substrate), and then sealed with a Surlyn strip and cover glasses, so that a dye-sensitized solar cell module is produced. The electrolyte solution is previously prepared by dissolving 0.1 M LiI, 0.05 M I2, 0.6 M 1-hexyl-2,3-dimethylimidazolium iodide, and 0.5 M 4-tert-butylpyridine using 3-metoxypropionitrile as a solvent.

(7) Process of Measuring Photocurrent-Voltage

If a sandwich cell as fabricated above is exposed to light from a xenon lamp (Yamashita Denso, a Xe arc lamp of 300 W) in state that the sandwich cell is connected to an AM (air mass) 1.5 simulating filter, a voltage-current characteristic curse of the sandwich cell is obtained using a source-measure unit (a Keithley 2400 source-measure unit). In this measurement, an electric potential is set in a voltage range of −6.0~0.0V and light is set to have an intensity of 100 mW/cm². In order to compensate a current under AM (air mass) 1.5 illumination, the photodiode inspected at NREL (National Renewable Energy Laboratory) is employed.

2. Comparable Embodiment

A dye-sensitized solar cell module fabrication method of the comparable embodiment includes the same processes as those in the fabrication method of the present invention, with the exception of omitting the processes of printing the titanium dioxide film using the titanium dioxide organosol and annealing the printed film.

Experiments are performed for dye-sensitized solar cell modules which are made by twos according to each of the present and comparable embodiments. The experimental resultant for the dye-sensitized solar cell modules of the present and comparable embodiments is obtained as specified in the following Table 1.

TABLE 1

| | # | Area (Cm²) | $I_{sc}$ (mA) | $J_{sc}$ (mA) | $V_{oc}$ (V) | FF (%) | PCE (%) |
|---|---|---|---|---|---|---|---|
| Present | 1 | 67 | 121.90 | 1.85 | 5.47 | 0.59 | 6.00 |
| Embodiments | 2 | 67 | 121.58 | 1.84 | 5.52 | 0.60 | 6.08 |
| Comparable | 1 | 67 | 96.79 | 1.47 | 5.75 | 0.54 | 4.54 |
| Embodiments | 2 | 67 | 88.75 | 1.34 | 5.56 | 0.59 | 4.42 |

In Table 1, "$I_{sc}$" is a short-circuit current, and "$J_{sc}$" is a short-circuit current per unit area. The "$J_{sc}$" corresponds to a current density when the solar cell is exposed to light in state that the solar cell is not connected to an external resistor (or an external circuit). This "$J_{sc}$" depends upon the quantities of electrons and electrical holes which are transmitted to an external circuit without being lost by the recombination of each other. Also, "Voc" is an open-circuit voltage and represents a voltage of the solar cell when an output current of the solar cell becomes "0". "FF (fill factor)" is used as a characteristic or an index of the solar cell module which represents a resemblance between a current-voltage curve of the solar cell module measured under illumination and a quadrilateral. Such a "FF" is obtained by dividing a multiple value of a current density $J_{max}$ and a voltage $V_{max}$ at a maximum electric-power point by a multiple value of $V_{oc}$ and $J_{sc}$. In other words, the "FF" corresponds to a calculated valued of "$(V_{max} \times J_{max})/(V_{oc} \times J_{oc})$". Furthermore, "PCE" represents a ratio between a maximum electric-power produced in a solar cell and the energy of incident light into the solar cell.

Figure 4:
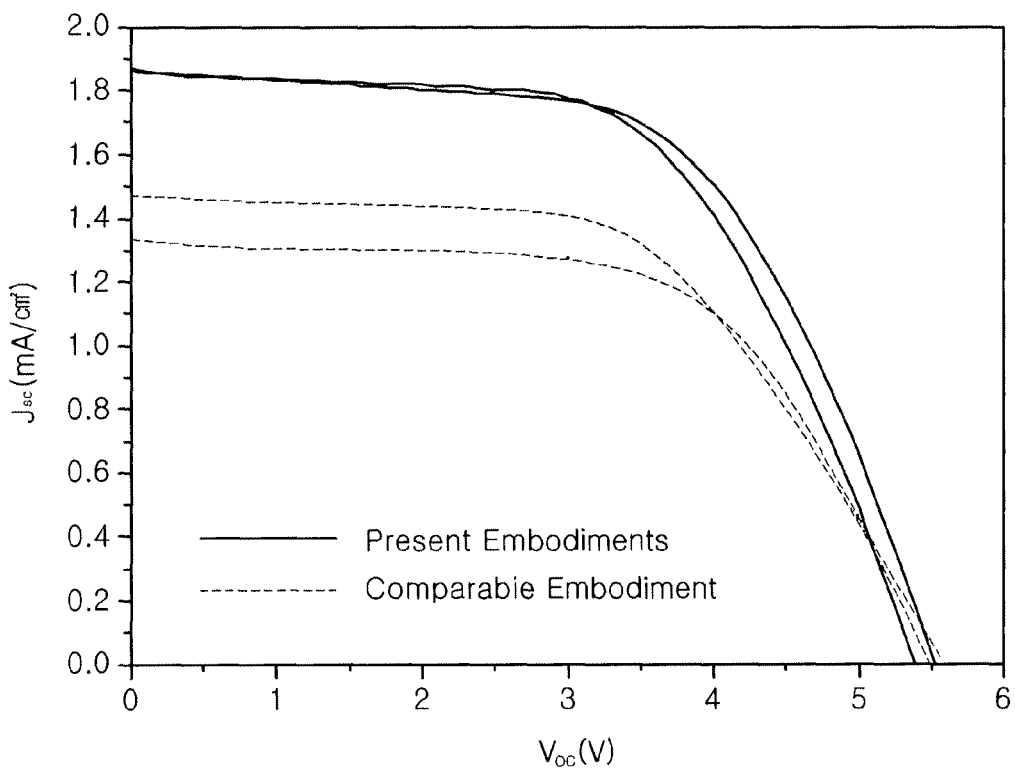
FIG. 4 is a graphic diagram comparatively showing current-voltage curves of dye-sensitized solar cell modules according to present and comparable embodiments.

As seen from Table 1 and a graphic diagram of FIG. 4, it is evident that the dye-sensitized solar cell modules of the present embodiment, which includes a titanium oxide film being formed from the titanium oxide organosol, have higher conversion efficiencies in comparison with those of the comparable embodiment without the titanium oxide film. In detailed, the dye-sensitized solar cell modules of the present embodiment have a higher efficiency range by about (6.00−4.54)×100/4.54=32.2% through (6.08−1.42)×100/4.42=37.6%, compared with those of the comparable embodiment.

Also, the dye-sensitized solar cell module fabrication method of the present embodiment can further perform the coating process of the titanium dioxide film after the titanium dioxide film 350 is formed using the titanium dioxide organosol. In this case, the electron loss in the interface between the titanium dioxide nano-particles can become much less. More specifically, although the titanium dioxide nano-particles 320 have a property getting together to form an aggregation, the titanium dioxide film 350 is primarily formed and then an additional titanium dioxide film is formed one more, so that the aggregative property of titanium dioxide nano-particles becomes much weaker. In accordance therewith, excited electrons is transmitted more quickly and effectively toward the first electrode 200. As such, a quantity of the excited electrons transmitted to the first electrode 200 greatly increases. Therefore, the conversion efficiency of the dye-sensitized solar cell module can become much greater.

Furthermore, the forming process of a metal oxide film 350 in the dye-sensitized solar cell module formation method according to the present embodiment can perform a selective print for the metal oxide nano-particles 320 using one among a screen printing method, an ink-jet printing method, a slit coating method, and a doctor blade method. In other words, the dye-sensitized solar cell module formation method according to the present embodiment can form the metal oxide film on only the metal oxide nano-particle without the metal electrical conductivity line 700 by coating the titanium dioxide organosol solution using one among the screen printing method, ink-jet printing method, slit coating method, and doctor blade method.

As described above, a dye-sensitized solar cell module according to the present embodiment includes a metal oxide film formation solution which is possible to selectively print. In detailed, the metal oxide formation solution can be selectively printed on only the surface of the metal oxide nano-particle without affecting the electrical conductivity of the transparent electrode and the sealant 600 interposed between the transparent electrodes. Therefore, the dye-sensitized solar cell module can greatly improve the conversion efficiency. Moreover, the dye-sensitized solar cell module can prevent the conversion efficiency deterioration at an enlarged size.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A dye-sensitized solar cell module comprising:
   a first substrate;
   a first electrode disposed on the first substrate;
   a blocking film disposed on the first electrode;
   nano-particles arranged on the blocking film;
   a film formed to encompass each of the nano-particles;
   a second substrate with a second electrode disposed above the nano-particles;
   an electrolyte interposed between the first and second electrodes;
   a metal electrical conductivity line formed to connect the first electrode with the second electrode; and
   a sealant disposed between the electrolyte and the metal electrical conductivity line,
   wherein the film is made of a titanium dioxide organosol solution,
   wherein the titanium dioxide organosol solution is made of a mixture of diethanolamine and titanium tetrabutoxide in ethanol and the titanium dioxide organosol solution is concentrated in a quantity of about 100 ml, and
   wherein the titanium dioxide organosol solution has a viscosity range of 3-5 cP (centipoise).

2. The dye-sensitized solar cell module claimed as claim 1, wherein the film is disposed on a part of each surface of the nano-particles.

3. The dye-sensitized solar cell module claimed as claim 1, wherein the blocking film, the nano-particles, and the film are formed from a metal oxide.

4. The dye-sensitized solar cell module claimed as claim 3, wherein the metal oxide includes titanium dioxide.

5. The dye-sensitized solar cell module claimed as claim 1, wherein the metal electrical conductivity line is configured to directly contact with the first electrode.

6. The dye-sensitized solar cell module claimed as claim 1, wherein the metal electrical conductivity line contains silver.

7. The dye-sensitized solar cell module claimed as claim 1, wherein the mixture is concentrated using a rotary evaporator.

8. The dye-sensitized solar cell module claimed as claim 1, wherein the film includes a first titanium dioxide film and a second titanium dioxide film, and wherein the first titanium dioxide film is coated on the nano-particles and the second titanium dioxide film is coated on the first titanium dioxide film.

* * * * *